United States Patent [19]

Sakamoto

[11] 3,922,844

[45] Dec. 2, 1975

[54] ELECTRONIC TIMEPIECE

[75] Inventor: Motoyoshi Sakamoto, Suwa, Japan

[73] Assignee: Kabushiki Kaisha Suwa Seikosha, Tokyo, Japan

[22] Filed: Apr. 25, 1974

[21] Appl. No.: 464,082

[30] Foreign Application Priority Data

Apr. 25, 1973 Japan .............................. 48-47041

[52] U.S. Cl. .................................. 58/23 R; 58/85.5

[51] Int. Cl.[2] ...................... G04C 3/00; G04B 27/08

[58] Field of Search ....... 56/23 R, 23 A, 24 R, 85.5, 56/23 AC

[56] References Cited

UNITED STATES PATENTS

| | | | |
|---|---|---|---|
| 3,451,210 | 6/1969 | Helterline, Jr. et al. | 58/24 R |
| 3,540,207 | 11/1970 | Keeler | 58/23 R |
| 3,553,957 | 1/1971 | Dome et al. | 58/24 R |
| 3,629,582 | 12/1971 | Koehler et al. | 58/23 X |
| 3,777,471 | 12/1973 | Koehler et al. | 58/85.5 X |
| 3,812,669 | 5/1974 | Wiget | 58/23 R |

*Primary Examiner*—L. T. Hix
*Assistant Examiner*—U. Weldon
*Attorney, Agent, or Firm*—Blum, Moscovitz, Friedman & Kaplan

[57] ABSTRACT

An electronic timepiece, having an oscillator circuit producing a high frequency time standard signal and a divider circuit formed from a plurality of series-connected divider stages for producing low frequency timekeeping signals in response to said time standard signal, is provided with an adjusting circuit adapted to set each divider stage to thereby adjust the timekeeping signal produced thereby. The adjusting circuit allows a setting signal from a memory circuit to be applied to each divider stage through gate circuits at the beginning of the period of said timekeeping signal to thereby correct the time-keeping signal.

10 Claims, 4 Drawing Figures

ELECTRONIC TIMEPIECE

BACKGROUND OF THE INVENTION

This invention relates to an electronic timepiece, and in particular to electronic timepieces having a circuit for adjusting the signal counted by the divider circuit. Heretofore, the adjustment of timekeeping signals counted by divider circuits was achieved by regulating the oscillating frequency of the oscillator circuit. For example where a tuning fork was utilized as a time standard element, the regulation of the frequency was effected by changing the mass at the end of the tuning fork. When a quartz crystal oscillator was utilized, the oscillating frequency of the oscillator circuit was regulated by inserting a variable capacitor into the oscillator circuit and changing the value of the capacitor in order to adjust the resonant frequency of the oscillator circuit. Nevertheless, these methods of regulating the time standard signal of said oscillator circuit were less than completely satisfactory. For example, when additional circuit elements and/or mechanical elements were added to the oscillator, the operation of the oscillator circuit became less stable. Moreover, because the resonant frequency of the quartz crystal vibrator had to be set within narrow limits in order to allow same to be regulated, the manufacture of such an oscillator circuit required considerable attention and extreme precision, thereby increasing the manufacturing costs of an electronic timepiece including such an oscillator circuit. Accordingly, it is desired to include an adjustment circuit which operates independently of the oscillator circuit in an electronic timepiece.

SUMMARY OF THE INVENTION

Generally speaking, in accordance with the invention, an electronic timepiece is provided including an oscillator circuit for producing a high frequency time standard signal and divider means including a plurality of series-connected divider stages for receiving said high frequency time standard signal and dividing same to produce a low frequency timekeeping signal which varies with respect to actual time counted thereby. A time adjusting circuit is coupled to each divider stage for supplying a setting signal to each divider stage, in each cycle of said timekeeping signal to adjust the period thereof.

The adjusting circuit is adapted to apply a signal to each of said plurality of divider stages at the beginning of each period of the timekeeping signal, the setting signal being applied from a memory circuit through a gate circuit.

Accordingly, it is an object of this invention to provide an improved electronic timepiece wherein the timekeeping signal can be adjusted without affecting the oscillator circuit.

Still another object of this invention is to provide an improved electronic timepiece wherein adjustment of the timekeeping signal is effected and the stability of the oscillator circuit is maintained.

Still another object of this invention is to provide an improved electronic timepiece capable of being manufactured at extremely low costs, yet admitting of precise operation.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENT

Figure 1:
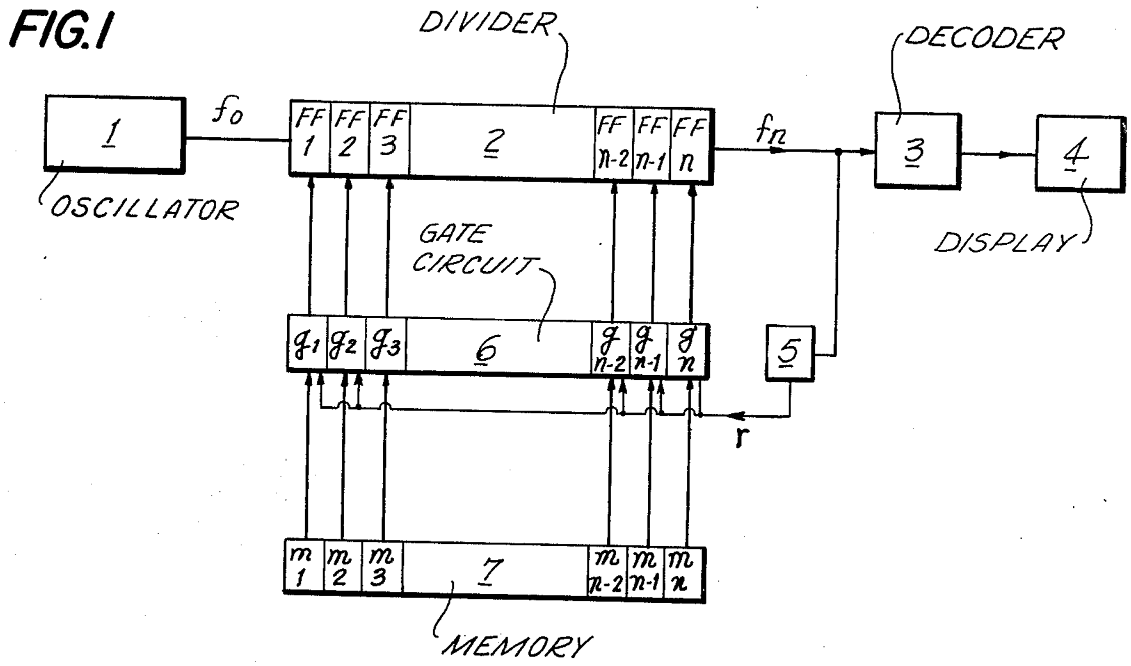
FIG. 1 is a block circuit diagram of an adjustment circuit constructed in accordance with the instant invention.

Referring to FIG. 1, an electronic timepiece including a timekeeping signal adjusting circuit is depicted therein. The electronic timepiece includes an oscillator circuit 1 adapted to produce a high frequency time standard signal $f_0$ for application to a divider circuit 2 formed of a plurality of divider stages $FF_1$ through $FF_n$. The divider circuit 2 produces a low frequency timekeeping signal $f_n$, the frequency of the timekeeping signal corresponding to $f_0$ and the number and type of divider stages provided. Accordingly, for purposes of discussion the divider stages $FF_1$ to $FF_n$ of divider circuit 2 can be any well known flip-flop circuits, binary flip-flops being utilized as each divider stage in the preferred embodiment illustrated in FIG. 1.

The timekeeping signal $f_n$ is supplied to a decoder circuit 3 which in turn supplies the decoded timekeeping signals to a display 4. If the timepiece has a conventional mechanical gear train driving hands or the like, then decoder 3 would be a transformer such as a stepping motor and would provide movement to a gear train to rotate the hands which would comprise display 4. On the other hand, if the electronic timepiece is utilized with a digital display comprised of liquid crystals or light emitting diodes, the decoder 3 would include further divider stages corresponding to seconds, hours, minutes, etc. and decoding and driving circuits would be associated with each further stage for providing driving signals to digital display elements 4. It is appreciated that the instant invention can be practiced with either type of display and therefore is not limited thereby.

The novel timekeeping adjustment circuit includes a pulse generator 5 adapted to receive the low frequency timekeeping signal $f_n$ and apply a pulse in response thereto to a gate circuit 6 comprised of gates $g_1$ through $g_n$, each of said gate corresponding to one of divider stages $FF_1$ through $FF_n$ of divider circuit 2. Finally, a memory circuit comprised of memory stages $m_1$ through $m_n$ is provided, each memory stage being adapted to supply a setting signal to a corresponding divider stage $FF_1$ through $FF_n$ in divider circuit 2 through corresponding gates $g_1$ through $g_n$ of gate circuit 6. Accordingly, the memory circuit applies said setting signal such as a reset to zero signal or set to one signal to the divider stages $FF_1$ through $FF_n$ upon the application of a pulse $r$ to the gate circuit 6 by pulse generator 5. Pulse generator 5 senses the beginning of each period of the low frequency timekeeping signal $f_n$ and supplies a signal to gate circuit 6 to thereby open the gate and allow the signals from memory 7 to be applied to divider circuit 2.

The signals supplied by memory stages $m_1$ through $m_n$ are utilized to set the divider stages $FF_1$ through $FF_n$ to the proper state. Accordingly, if the timekeeping signal $f_n$ is retarded and therefore provides a timekeeping signal having a period which is longer than the actual time desired, the amount of error Δt for each period and the mode of counting, either addition or subtraction is determined. The memory circuit then is set to apply setting signals determined by the state of the divider stages counting in an opposite counting mode at a time Δt prior to the end of each period to each divider stage once each period. The setting signals set the divider stages once each period to thereby adjust the timekeeping signal to provide an adjusted timekeeping signal corresponding to actual time.

Specifically, the operation of the circuit depicted in FIG. 1 is as follows. If the flip-flops of divider circuit 2 count in a subtraction mode, namely $FF_1$ through $FF_n$ begin each period of the timekeeping signal at 1, 1, ..., 1 and end each period at 0, 0, ..., 0, then the memory circuit 17 will be set by determining the state that each of the binary divider stages of the divider circuit 2, at a time $\Delta t$ prior to the beginning of the next period if the divider circuit 2 were counting in an addition mode from 0, 0, ..., 0 to 1, 1, ..., 1.

Figure 3:
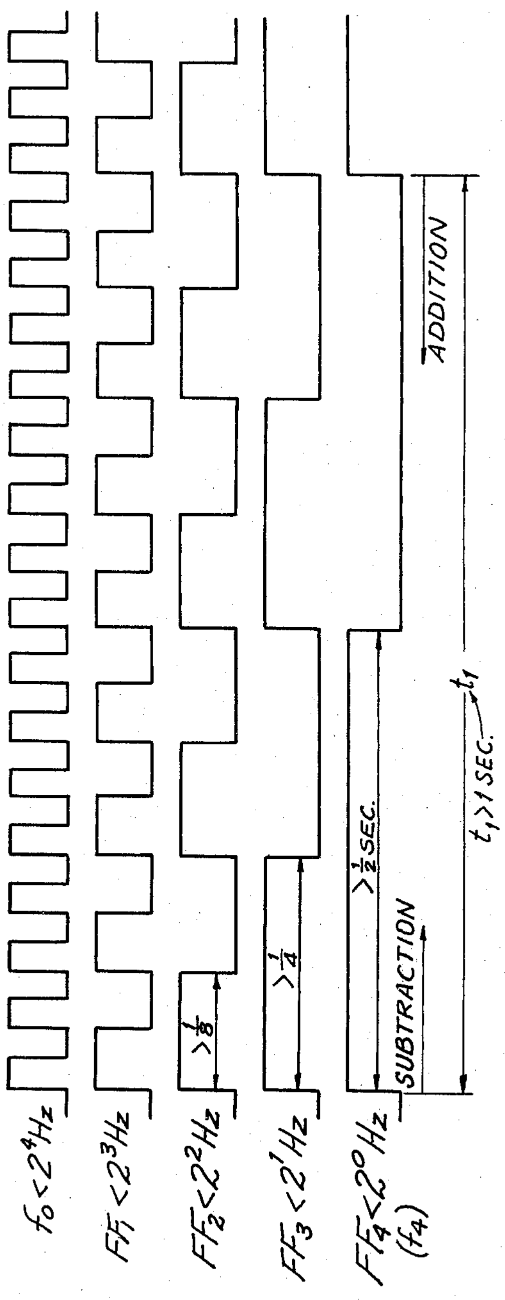
FIGS. 3 and 4 are timing diagrams corresponding to the different adjustments effected by the circuit depicted in FIG. 1.
Figure 4:
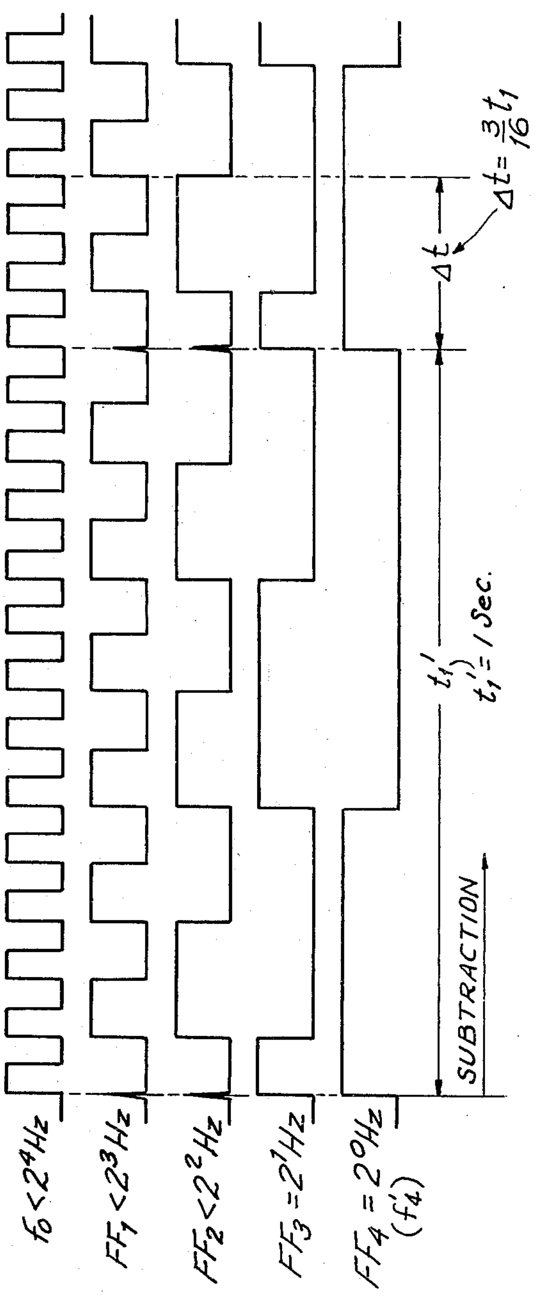

Exemplary wave forms of one embodiment of the invention are depicted in FIGS. 3 and 4. For purposes of explanation, signal $f_4$ is taken as a timekeeping signal having a period larger than one second. As illustrated in FIG. 3, if $f_0$ is less than $2^4$ Hz, the four divider stages $FF_1$ to $FF_4$ produce a low frequency timekeeping signal, $f_4$, having a period $t_1$ larger than 1 second. Because the oscillator circuit is not regulated or adjusted in practicing the invention, as depicted in FIG. 3, the signal applied by the oscillator circuit will be on the order of $2^4$ cycles for each period $t_1$ of the timekeeping signal $f_4$. Of course, oscillator circuits for electronic timepieces usually provide much higher frequencies such as $2^{16}$ or $2^{32}$ Hz and a signal having a frequency $f_0$ on the order of $2^4$ Hz is utilized by way of example only. Thus, the divider circuit according to the example depicted in FIG. 3 counts in a subtraction mode so that flip-flops $FF_1$ through $FF_4$ are each at one at the beginning of each period and are counted down to zero at the end of each period.

As is illustrated in FIG. 4, when the high frequency standard signal $f_0$ is less than $2^4$ Hz, the period $t_1$ of the low frequency timekeeping signal $f_4$ is a retarded signal having a period greater than 1 second and will cause the time displayed to be slower than actual time. Accordingly, the first step in making the necessary adjustment of the period $t_1$ is to determine the actual error $\Delta t$ in the timekeeping signal $f_4$. For the example illustrated in FIGS. 3 and 4, the error Δt is equal to three-sixteenths of the uncorrected timekeeping signal.

Accordingly, since divider stages $FF_1$ through $FF_4$ are counting in a subtraction mode, the memory circuits are set to apply setting signals to each divider stage at the beginning of each period of the timekeeping signal $f_4'$. The setting signals represent the state of each divider stage of the divider circuit if it were counting in the addition mode at a time a fraction of a second $\Delta t$ prior to the beginning of each period of the timekeeping signal. By viewing FIG. 3 it is seen that the addition mode is obtained by reading the periods from the right to the left where FF1 through FF4 equal 0000 at the beginning of each period and are counted up to 1111 at the end of each period. Accordingly, at a time $\Delta t$ prior to the end of the period where $\Delta t$ equals three-sixteenths of time period $t_1$ on the order of but greater than 1 second, the divider stages FF1, FF2, FF3 and FF4 are equal to 0, 0, 1, 1, respectively. Thus, the memory circuits $m_1$ through $m_4$ supply reset to zero signals to divider stages $FF_1$ and $FF_2$ at the beginning of each period of the timekeeping signal and allows $FF_3$ and $FF_4$ to continue counting in an uninterrupted manner. The setting is effected by application of pulse $r$ to gate circuit 6 by pulse generator 5 upon sensing the beginning of each period of the timekeeping signal by the upward rise of the timekeeping signal at the beginning of each period when the divider circuit is in the subtraction mode. Accordingly, the opening of the gate circuit 6 allows memory signals from memory stages $m_1$ to $m_4$ be applied to the divider stages in the manner stated above and a timekeeping signal $f_4$ having an accurate time period $t_1'$ is produced.

Figure 2:
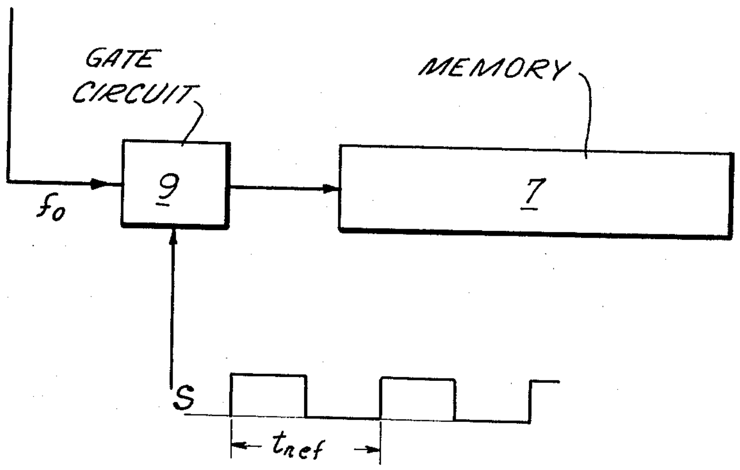
FIG. 2 is a block circuit diagram of a memory circuit particularly adapted for use with the adjustment circuit illustrated in FIG. 1.

Reference is now made to FIG. 2 wherein a particular memory circuit for use with the timekeeping frequency adjustment circuit depicted in FIG. 1 is illustrated. The memory circuit 7 comprises a divider circuit identical to the divider circuit 2 having the same number of stages as divider circuit 2 each stage thereof corresponding to a divider stage of divider circuit 2. The high frequency standard signal $f_0$ is applied to the memory divider circuit 7 through gate circuit 9 upon the opening of the gating circuit by the application of a gating signal S. Gating signal S which signal is a reference signal having an exact period that the timekeeping signal $f_n$ is to be adjusted to, is produced by a calibration source (not shown) which source is without the scope of the instant invention, and is applied to the gate circuit 9 to thereby allow the high frequency standard time signal to be applied to the divider circuit for an actual time period. Thus, if the timekeeping signal $f_n$ is intended to be an exact one second signal, a one second signal S is applied to the gating circuit 9 to thereby apply the high frequency time standard signal $f_0$ to the memory divider circuit 7 for exactly one second. After the counting mode of the divider circuit 2, namely either addition or subtraction is determined, and the memory divider stages are selected to count in a counting mode opposite to the divider circuit, the error $\Delta t$ will automatically be determined by the application of the high frequency standard signal $f_0$ to the memory divider circuit for the actual time to be counted because the states of the memory divider stages 7 set in a reciprocal counting mode at the end of the actual time period will automatically determine the setting signals to be applied at the beginning of each period of the timekeeping signal. If, for example, the divider circuit counts in the subtraction mode illustrated in FIG. 3, then a memory divider circuit is selected, which counts in an addition mode and upon application of the uncorrected time standard $f_0$ for 1 second automatically applies addition mode signals to thereby effect the same correction as illustrated in FIG. 4. Accordingly, by selecting a memory divider circuit 7 that counts in either a subtraction or addition counting mode so that same is opposite to the counting mode of the divider circuit 2 and adjustment of the period of the timekeeping signal is automatically achieved.

It is noted that although the instant invention has been illustrated as including a divider circuit formed of binary divider stages, the type of counters utilized are not so limited. Moreover, because high frequencies are counted by the circuitry thereof, C-MOS integrated circuitry utilizing silicon gate techniques and/or SOS techniques can be utilized. If an SOS technique is utilized each divider stage can be separate and independent from the other divider stages and of course be thin and have minimal stray capacitance at the gate insulating terminals thereby providing minimal power consumption. It is further desirable to utilize a non-volatile circuit in the memory so that the data thereof is not destroyed when the battery is detached. Accordingly, by utilization of these features the manufacture of an electronic timepiece at minimum cost by elimination of adjustment means to the oscillator circuit is provided.

It still thus will be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an electronic timepiece including an oscillator circuit producing a high frequency time standard signal, divider means including a plurality of series-connected divider stage counters for receiving said high frequency time standard signal and dividing same to produce a low frequency timekeeping signal of a frequency having a period which is different than the actual time sought to be counted thereby, the improvement comprising timekeeping signal adjusting means coupled by output means to each divider stage counter, said adjusting means including memory means, said adjusting means being responsive to said timekeeping signal for supplying setting signals to predetermined divider stage counters through said output means selected by said memory means at the beginning of each period of said timekeeping signal to reset the count of each of said divider stage counters having setting signals applied thereto to adjust the period of said timekeeping signal to the actual time sought to be counted.

2. An electronic timepiece as claimed in claim 1, wherein said output means includes a gating circuit coupled to said memory means and to each of said binary divider stage counters, said memory means effecting the setting of said gating circuit so that same in response to the beginning of each period of said timekeeping signal effects a predetermined gating of said setting signals to each of said predetermined divider stage counters.

3. An electronic timepiece as claimed in claim 2, wherein said adjusting means further includes a pulse generating circuit for receiving said timekeeping signal and in response thereto applying a pulse to said gating circuit once each period of said timekeeping signal.

4. An electronic timepiece as claimed in claim 3, wherein said setting signals set to one each of said predetermined divider stage counters selected at the beginning of each period of said timekeeping signal.

5. An electronic timepiece as claimed in claim 4, wherein said divider means is adapted to count in an addition mode, the state of each divider stage counter when counting in an opposite mode for a period corresponding to actual time determining the predetermined counters to which said setting signals are applied by said memory means.

6. An electronic timepiece as claimed in claim 3, wherein said memory means includes a second gating circuit having applied thereto a reference signal corresponding to the actual period which it is desired to adjust the time-keeping signal to, said memory means further including a memory divider circuit having the same number of divider stage counters as said divider circuit, said memory divider stage counters being set to count in the opposite counting mode from the divider stage counters of said divider circuit, said memory gating circuit being adapted to apply said high frequency standard signal to said memory divider circuit for the period determined by said reference signal, the state of each of said memory divider stage counters at the end of said period determined by said reference signal automatically predetermining the setting of said gating circuit to determine the stage counters having setting signals applied thereto at the beginning of each period of said time-keeping signal.

7. An electronic timepiece as claimed in claim 3, wherein said setting signals reset to zero each of said predetermined divider stage counters selected at the beginning of each period of said timekeeping signal.

8. An electronic timepiece as claimed in claim 7, wherein said divider means is adapted to count in an addition mode, the state of each divider stage counter when counting in an opposite mode for a period corresponding to actual time determining the predetermined counters to which said setting signals are applied by said memory means.

9. An electronic timepiece as claimed in claim 4, wherein said divider means is adapted to count in a subtraction mode, the state of each divider stage counter when counting in an opposite mode for a period corresponding to actual time determining the predetermined counters to which said setting signals are applied by said memory means.

10. An electronic timepiece as claimed in claim 7, wherein said divider means is adapted to count in a subtraction mode, the state of each divider stage counter when counting in an opposite mode for a period corresponding to actual time determining the predetermined counters to which said setting signals are applied by said memory means.

* * * * *